(12) United States Patent
Terase et al.

(10) Patent No.: US 6,495,257 B1
(45) Date of Patent: Dec. 17, 2002

(54) FINE PARTICULATE SILICA GEL AND FINE PARTICULATE SILICA GEL INTERNALLY CONTAINING MICROPARTICLES OF A METAL COMPOUND

(75) Inventors: Kunihiko Terase, Fukuoka (JP); Masaki Inoue, Fukuoka (JP); Eiichi Ono, Fukuoka (JP)

(73) Assignees: Asahi Glass Company, Limited, Tokyo (JP); Dohkai Chemical Industry Co., Ltd., Kitakyushu (JP)

( * ) Notice: Subject to any disclaimer, the term of this patent is extended or adjusted under 35 U.S.C. 154(b) by 0 days.

(21) Appl. No.: 09/621,483

(22) Filed: Jul. 21, 2000

(30) Foreign Application Priority Data

Jul. 23, 1999 (JP) ............................. 11-208587

(51) Int. Cl.$^7$ ............................. B32B 5/16; B01J 20/10; C01B 33/16
(52) U.S. Cl. ...................... 428/404; 423/338; 424/70.9; 502/405; 502/407
(58) Field of Search .................. 516/111; 423/338; 428/404; 502/407, 405

(56) References Cited

U.S. PATENT DOCUMENTS

| | | | | |
|---|---|---|---|---|
| 2,765,242 A | * | 10/1956 | Alexander et al. | 516/111 |
| 3,935,299 A | | 1/1976 | Kiselev et al. | 423/338 |
| 3,950,316 A | * | 4/1976 | Witt | 423/338 X |
| 5,229,096 A | * | 7/1993 | Cohen | 423/338 |
| 5,256,386 A | * | 10/1993 | Nyström et al. | 423/338 |
| 5,391,385 A | * | 2/1995 | Seybold | 502/407 X |
| 5,418,043 A | | 5/1995 | Ogawa et al. | 428/195 |
| 5,419,888 A | * | 5/1995 | McGill et al. | 516/111 X |
| 5,658,553 A | | 8/1997 | Rice | 423/339 X |
| 5,738,718 A | * | 4/1998 | Mori et al. | 423/338 X |

FOREIGN PATENT DOCUMENTS

| | | |
|---|---|---|
| JP | 06-298520 | 10/1994 |
| JP | 08-081329 | 3/1996 |
| JP | 09-071410 | 3/1997 |
| JP | 11-138017 | 5/1999 |
| JP | 11-302011 | 11/1999 |

* cited by examiner

Primary Examiner—Richard D. Lovering
(74) Attorney, Agent, or Firm—Oblon, Spivak, McClelland, Maier & Neustadt, P.C.

(57) ABSTRACT

Fine particulate silica gel having the following characteristics (1) to (3):

(1) average particle size: from 1 to 200 $\mu$m;
(2) oil absorption in accordance with JIS K5101: from 100 to 300 ml/100 g; and
(3) hygroscopicity represented by moisture adsorption under a relative humidity of 90% at 25° C. in accordance with JIS Z0701: not more than 20 wt %.

5 Claims, No Drawings

FINE PARTICULATE SILICA GEL AND FINE PARTICULATE SILICA GEL INTERNALLY CONTAINING MICROPARTICLES OF A METAL COMPOUND

The present invention relates to fine particulate silica gel, and fine particulate silica gel internally containing microparticles of a metal compound such as a metal oxide in the particles.

Fine particulate silica gel, such as fine spherical silica gel is employed in various uses, such as a separating material for liquid chromatography, a filler for cosmetics, a filler for resins, a carrier for catalysts and a spacer.

Further, fine particulate silica gel, such as fine spherical silica gel, internally containing microparticles of a metal compound in the particles (hereinafter referred to as "fine particulate silica gel internally containing microparticles of a metal compound") is employed for e.g. an ultraviolet ray shielding agent, a photooxidation catalyst and an antibacterial agent.

Fine particles of silica gel are porous particles, wherein the pore structure measured by a nitrogen adsorption method has a pore volume of from 0.2 to 2 ml/g and a specific surface area of from 150 to 900 $m^2/g$, and one having an oil absorption of at least 100 ml/100 g is preferably employed in various uses such as materials for cosmetics.

However, silica gel usually has a nature to highly absorb moisture in air, because of its porosity.

When silica gel having moisture highly absorbed is to be used as a blending material for a cosmetic, a phenomenon such that the oil absorption of e.g. a solvent decreases, occurs, which is problematic. On the other hand, if silica gel having moisture highly absorbed, is incorporated in a resin composition, followed by injection molding or extrusion molding, there will be a problem that the moisture adsorbed by silica gel particles will be desorbed, and the resin is likely to undergo foaming due to the generated steam.

Therefore, in a case where fine particles of silica gel are to be used for such a purpose, it is usually necessary to hermetically package them or accommodate them in a sealed container, so that they will not adsorb moisture in air during the storage. Further, when fine particles of silica gel are stored for a long period of time, adsorption of moisture to some extent is unavoidable, and at the time of use, it will be necessary o carry out burdensome treatment such as heating them at a temperature of at least 150° C. to desorb the moisture.

On the other hand, in a specific use such as use as a filler for cosmetics or a filler for resin films, it is often required that the mechanical strength of fine particles of silica gel be small. Namely, fine particles of silica gel are preferably readily disintegratable in order to reduce the porosity among particles in the final blend composition containing the fine particles of silica gel.

However, with respect to fine particles of silica gel, it has been very difficult to satisfy both demands for low hygroscopicity and low mechanical strength of the silica gel particles.

On the other hand, with respect to fine particulate silica gel internally containing microparticles of a metal compound, one having an oil absorption of at least 100 ml/100 g, is used as a filler for e.g. resin films or cosmetic materials. Here, basically the same problems as described above with respect to the particulate silica gel, exist.

Namely, also with respect to the fine particulate silica gel internally containing the metal compound, silica usually has a nature to highly absorb moisture in air, and when the particulate silica gel internally containing the metal compound, which has highly absorbed moisture, is used as a blending material for a cosmetic, phenomenon such that the oil absorption of e.g. a solvent will decrease, occurs, which is problematic.

Likewise, also in a case where the particulate silica gel internally containing the metal compound, which has highly absorbed moisture, is blended to a resin composition, followed by injection molding or extrusion molding, there will be a problem that the adsorbed moisture is likely to be desorbed, and the resin is likely to undergo foaming due to the generated steam.

Therefore, in a case where fine particles of such particulate silica gel internally containing a metal compound, are to be used for such a purpose, it will be necessary to hermetically package them or accommodate them in a sealed container to likewise shut out moisture in air. Further, in a case of storage for a long period of time, adsorption of moisture to some extent is unavoidable, and at the time of use, it will be necessary to carry out burdensome treatment such as heating them at a temperature of at least 150° C. to desorb the moisture.

Further, in a specific use such as use as a filler for cosmetics or a filler for resin films, it is often preferred that fine particles of silica gel are readily disintegratable, and the mechanical strength of particles is required to be small. Also with particulate silica gel internally containing microparticles of a metal compound, it has been also very difficult to satisfy both demands for low hygroscopicity and low mechanical strength.

It is an object of the present invention to provide fine particulate silica gel and fine particulate silica gel internally containing microparticles of a metal compound, having a low hygroscopicity, whereby the above-mentioned problems accompanied by adsorption of moisture in air, have been substantially solved, while maintaining an oil absorption of at least 100 ml/100 g which is a usual level of oil absorption.

A further object of the present invention is to provide fine particulate silica gel and fine particulate silica gel internally containing microparticles of a metal compound, which are readily disintegratable and have small mechanical strength, while maintaining the above properties.

The present invention has been made to solve the above problems.

Firstly, the present invention provides fine particulate silica gel having the following characteristics (1) to (3):

(1) average particle size: from 1 to 200 μm;
(2) oil absorption in accordance with JIS K5101: from 100 to 300 ml/100 g; and
(3) hygroscopicity represented by moisture adsorption under a relative humidity of 90% at 25° C. in accordance with JIS Z0701: not more than 20 wt %.

Namely, the fine particulate silica gel of the present invention has a feature that the hygroscopicity is low without lowering the oil absorption.

Secondly, the fine particulate silica gel has a particle shape which is preferably a fine spherical particle shape. Namely, a preferred particle shape is a fine spherical particle shape.

Thirdly, in the fine spherical particles of the second aspect, the average value of mechanical strengths of particles having particle sizes of from 2 to 10 μm, is from 0.1 to 1.0 $kgf/mm^2$. Namely, the fine spherical particles having an average particle size of from 5 to 10 μm have a feature that their mechanical strength is lower than that of conventional particles.

Fourthly, the present invention provides fine particulate silica gel internally containing microparticles of a metal compound and having the following characteristics (1) to (4):

(1) average particle size: from 1 to 200 μm;
(2) proportion to $SiO_2$ of the microparticles of a metal compound in the particles: from 5 to 80 wt %;
(3) oil absorption in accordance with JIS K5101: from 100 to 300 ml/100 g; and
(4) hygroscopicity represented by moisture adsorption under a relative humidity of 90% at 25° C. in accordance with JIS Z0701: not more than 20 wt %.

Thus, the fine particulate silica gel internally containing microparticles of a metal compound according to the present invention, has a feature that the hygroscopicity is low without lowering the oil absorption.

Fifthly, in the fine particulate silica gel of the fourth aspect, the shape of particles internally containing the microparticles of a metal compound is a fine spherical particle shape. Namely, also in the case of the fine particulate silica gel internally containing microparticles of a metal compound, the preferred particle shape is a fine spherical particle shape.

Sixthly, in the fine particulate silica gel according to the fifth aspect, the average value of mechanical strengths of particles having particle sizes of from 2 to 10 μm is preferably from 0.1 to 1.0 $kgf/mm^2$. Namely, also in the case of the fine particulate silica gel internally containing the microparticles of a metal compound, particles having particle sizes of from 2 to 10 μm preferably have a feature that their mechanical strength is lower than that of conventional particles.

The oil absorption in accordance with JIS K5101 is measured specifically as follows.

5 g of a sample is placed in the center of a sufficiently large flat glass plate, and each time, 4 or 5 drops of boiled linseed oil are gradually dropped from a burette onto the center of the sample. Each time, the entirety is sufficiently kneaded with a pallet knife. The dropping and kneading procedure is repeated until the sample becomes a hard putty like lump. Then, kneading is carried out after every drop, and the point when one more drop creates a sample capable of being wound around the pallet knife in a spiral, is taken as an end point. However, where it can not be wound spirally, the point just before it quickly becomes soft with one more drop of boiled linseed oil is taken as the end point. Here, the operation time to reach the end point is controlled to be from 7 to 15 minutes.

The volume of boiled linseed oil dropped until the end point is reached, is divided by a unit mass of the sample, and the value thereby obtained is multiplied 100 times to obtain the oil absorption (ml/g).

The hygroscopicity in accordance with JIS Z0701 is measured specifically as follows.

A sample is heated at a temperature of from 170 to 190° C. for about 2 hours. Then, 0.3 to 0.5 g of the sample is taken into a flat weighing bottle and is spread in a thickness as uniform as possible, whereupon a cover is placed immediately, followed by cooling to room temperature in a desiccator. In this state, the weight of the sample in the weighing bottle is weighed. Then, the sample is stored with the cover of the weighing bottle removed, in a glass container which contains a sulfuric acid solution having a concentration of 18.5 mass % (specific gravity: 1.125) in order to maintain the relative humidity at 90%. During the storage, the temperature is maintained at 25±2.5° C. 48 Hours later, the sample is taken out, and after putting a cover on the weighing bottle immediately, the sample is weighed. The hygroscopicity is obtained by the following formula.

$$Hygroscopicity(\%)=( (W_1-W_0)/W_0)\times 100$$

where
$W_0$: Initial mass of the sample
$W_1$: Mass of the sample after 48 hours.

Now, the present invention will be described in detail with reference to the preferred embodiments.

The fine particulate silica gel and the fine particulate silica gel internally containing microparticles of a metal compound, of the present invention (hereinafter referred to simply as "fine particulate silica gel or the like" when both silica gels are meant) have an average particle size of from 1 to 200 μm and an oil absorption of from 100 to 300 ml/100 g, as measured in accordance with JIS K5101, and its hygroscopicity and the mechanical strength are specified as follows.

① Firstly, with respect to the hygroscopicity of the fine particulate silica gel or the like, the hygroscopicity represented by the moisture adsorption (equilibrium moisture adsorption) under a relative humidity of 90% at 25° C. in accordance with JIS Z0701, is very low at a level of not more than 20 wt %, preferably from 4 to 10 wt %.

If the hygroscopicity exceeds 20 wt %, the above-mentioned problem resulting from moisture adsorption, will be distinct and will be problematic. On the other hand, if the hygroscopicity is less than 4 wt %, the oil absorption tends to be less than 100 ml/100 g, thus leading to a problem.

With conventional fine particulate silica gels, it is common that the average particle size is from 1 to 200 μm, and the oil absorption in accordance with JIS K5101 is from 100 to 300 ml/100 g, and particularly the hygroscopicity under a relative humidity of 90% at 25° C. in accordance with JIS Z0701 is from 30 to 80 wt % in the case of fine particulate silica gel, or from 35 to 60 wt % in the case of particulate silica gel internally containing microparticles of a metal compound. Thus, in each case, the hygroscopicity is very high. Whereas, the fine particulate silica gel or the like of the present invention has a remarkable feature that the hygroscopicity is not more than 20 wt %.

Further, the specific surface area of the fine particulate silica gel or the like of the present invention is preferably from 30 to 200 $m^2/g$, more preferably from 40 to 180 $m^2/g$.

② On the other hand, with respect to the mechanical strength of the fine particulate silica gel or the like, the following formula by Hiramatsu et al (Hiramatsu et al, Japan Mining Industry Association, 81, 10, 24(1965)) is, for example, known as a general formula for the mechanical strength in the case of spherical particles:

$$St=2.8P/(\pi d^2)$$

where St is the mechanical strength ($kgf/mm^2$) of particles at the time of breakage, as obtained as a measured value, P is a compression load (kgf), and d is a particle diameter (mm).

As is evident from the formula, the mechanical strength of fine particles is inversely proportional to the square of the particle size, and the smaller the particle size, the larger the particle strength.

In the present invention, the mechanical strength of fine particles is measured by e.g. a fine compression tester (MCTM-500 Model), manufactured by Shimadzu Corporation by means of this formula. Namely, a load is exerted to a particle having a particle size of d increasingly at a constant rate, and the load when the sample particle breaks as observed by an abrupt increase of the change, is taken as the mechanical strength. In this manner, measurements are carried out with respect to particle sizes of $d_1, d_2, \ldots, d_n$, respectively, and an average value is obtained. Here, an average value of 30 particles is taken. Here, the particle sizes are values measured by an optical microscope.

With the fine particulate silica gel or the like of the present invention, the average value of mechanical strengths of 30 particles having particle sizes of from 2 to 10 μm measured as described above, is very low at a level of from 0.1 to 1.0 kgf/mm$^2$.

When the mechanical strength is within this range of from 0.1 to 1.0 kgf/mm$^2$, no breakage of fine particles substantially takes place during transportation of the powder or during usual powder operation such as simple mixing, and at the same time, it is a preferred range such that the required easily disintegratable characteristics can be sufficiently satisfied when the fine particles are used as a filler for cosmetics or as a filler for resin films.

When the mechanical strength is less than 0.1 kgf/mm$^2$, the strength tends to be so low that the fine particles are likely to be broken during transportation of the powder or during usual powder operation such as simple mixing. On the other hand, if it exceeds 1.0 kgf/mm$^2$, the strength tends to be so high that it becomes difficult to satisfy the readily disintegratable characteristics required when the fine particles are to be used as a filler for cosmetics or as a filler for resin films.

The fine particulate silica gel or the like of the present invention is very much characterized also by this mechanical strength, since the mechanical strength (the average value of 30 particles) of particles having a particle sizes of from 2 to 10 μm of each of various types of conventional commercial products of fine particulate silica gels having oil absorptions of from 100 to 300 ml/100 g, is from 3.0 to 10.0 kgf/mm$^2$, and the mechanical strength (the average value of 30 particles) of particles having particle sizes of from 2 to 10 μm of each of various types of conventional commercial products of particulate silica gels internally containing metal oxides, is from 1.2 to 3.0 kgf/mm$^2$.

With respect to the fine particulate silica gel internally containing microparticles of a metal compound of the present invention, the proportion to $SiO_2$ of the microparticles of a metal compound in the particles, is from 5 to 80 wt %.

If the content of the metal compound is less than 5 wt %, effects of the metal compound such as an ultraviolet ray-shielding effect, a photooxidation catalytic effect and an antibacterial effect, tend to be hardly obtainable. On the other hand, if it exceeds 80 wt %, it tends to be difficult for silica gel to sufficiently internally contain the particles of the metal compound, and the microparticles of the metal compound are likely to be in direct contact with the resin to be blended or with the matrix component of e.g. a cosmetic and thereby to modify or decompose it.

The microparticles of a metal compound to be used, are preferably very fine particles, particularly preferably those so-called ultrafine particles.

The primary particle size (the particle diameter) of the microparticles of a metal compound in the present invention is from 0.002 to 0.5 μm, preferably from 0.01 to 0.5 μm, more preferably from 0.01 to 0.3 μm.

Useful as the metal compound is, for example, microparticles of a metal oxide, such as titanium oxide, titanium peroxide, zinc oxide, cerium oxide, ferrous oxide, ferric oxide, zirconium oxide, chromium oxide, aluminum oxide, magnesium oxide, silver oxide, cuprous oxide, cupric oxide, cobaltous oxide, tricobalt tetroxide, cobaltic oxide, nickelous oxide, nickelic oxide, thorium oxide, tungsten oxide, molybdenum oxide, manganese dioxide, manganese trioxide, uranium oxide, germanium oxide, stannous oxide, stannic oxide, lead monoxide, trilead tetroxide, lead dioxide, antimony trioxide, antimony pentoxide or bismuth trioxide.

Further, other than metal oxides, microparticles of a sulfide such as cadmium sulfide, zinc sulfide, antimony sulfide, lead sulfide or nickel sulfide; microparticles of a sulfate such as strontium sulfate or barium sulfate; microparticles of a phosphate such as copper pyrophosphate; microparticles of a carbide such as tantalum carbide, zirconium carbide, tungsten carbide, vanadium carbide, titanium carbide or silicon carbide; or microparticles of a halide such as calcium fluoride, may also be employed. Further, depending upon a particular case, microparticles of a metal such as gold, silver, platinum, copper or aluminum, or of an alloy thereof, may also be employed.

Among the above-mentioned metal compounds, as a metal compound capable of imparting an ultraviolet ray-shielding function, it is preferred to use, for example, titanium oxide, zinc oxide, cerium oxide, iron oxide or zirconium oxide. As a metal compound capable of imparting a photooxidation catalytic function, it is preferred to use titanium oxide. The processes for producing the fine particulate silica gel and the fine particulate silica gel internally containing microparticles of a metal compound, according to the present invention, are not particularly limited, but the following processes proposed by the present inventors are preferred.

(1) For the production of the fine particulate silica gel, it is preferred to employ a process for producing fine particulate silica gel comprising:

① A hydrogelation step of reacting an alkali metal silicate with a mineral acid to obtain a silica hydrogel wherein the ratio of the weight of metal to the weight of $SiO_2$ is from 1.5 to 5.0;

② A hydrothermal pulverization step of subjecting the obtained silica hydrogel to hydrothermal treatment in a slurry state having a $SiO_2$ concentration of from 5.0 to 15.0 wt % with stirring to obtain a pulverized silica hydrogel slurry having an average particle size of at most 100 μm; and ③ A drying step of drying the pulverized hydrogel slurry.

(2) For the production of the fine particulate silica gel internally containing microparticles of a metal compound, it is preferred to employ a process comprising:

① A hydrogelation step of reacting an alkali metal silicate with a mineral acid to obtain a silica hydrogel wherein the ratio of the weight of water to the weight of $SiO_2$ is from 1.5 to 5.0;

② A step of preparing a pulverized silica hydrogel slurry comprising a hydrothermal pulverization step of subjecting the obtained silica hydrogel to hydrothermal treatment in a slurry state having a $SiO_2$ concentration of from 5.0 to 15.0 wt % with stirring to obtain a pulverized silica hydrogel slurry having an average particle size of at most 100 μm;

③ A mixed slurrying step of introducing microparticles of a metal compound into the pulverized silica hydrogel slurry to obtain a mixed slurry of microparticles of silica hydrogel and microparticles of a metal compound; and ④ A drying step of drying the mixed slurry.

Now, the above-mentioned processes will be described in detail.

Hydrogelation Step

An aqueous solution of an alkali metal silicate such as sodium silicate and an aqueous mineral acid solution are introduced from separate inlets into a container equipped with a discharge outlet and instantaneously uniformly mixed to form a silica sol having a $SiO_2$ concentration of at least 130 g/l and a pH of from 7 to 9, which is immediately discharged from the above-mentioned discharge outlet into a gas medium such as air and gelled in air while it is flying to draw a parabola. At the falling site, an aging tank containing water is placed, and gelled particles are permitted to fall in the aging tank and aged for from a few minutes to a few tens minutes.

A suitable acid is added thereto to lower the pH thereby to terminate the aging. The obtained silica hydrogel is spherical particles having an average particle diameter of a few mm. This silica hydrogel contains an alkali metal salt such as $Na_2SO_4$ formed by the reaction. Accordingly, it is preferred to sufficiently remove it by washing with water in accordance with a conventional method.

This silica hydrogel may be roughly pulverized, for example, by a roll crusher, whereby a pulverized product of silica hydrogel having an average particle size of from 0.1 to 5 mm can easily be obtained. This particle size is within a preferred range for carrying out e.g. a stirring operation efficiently in the subsequent hydrothermal pulverization step.

As another method for obtaining the silica hydrogel, a method may be mentioned wherein an aqueous alkali metal silicate solution and an aqueous mineral acid solution are uniformly mixed in a short period of time in a reactor to form a silica sol, and then the solution is gelled in a separate tray.

Here, the ratio of the weight of water to the weight of $SiO_2$ in the silica hydrogel, is preferably from 1.5 to 5.0.

If the ratio of the weight of water to the weight of $Sio_2$ is less than 1.5, the effect for pulverizing to reduce the average particle size of the silica hydrogel in the subsequent hydrothermal treatment step, tends to be small. On the other hand, if the ratio of the weight of water to the weight of $SiO_2$ exceeds 5.0, the mechanical strength of the silica hydrogel tends to be extremely weak, and the subsequent handling tends to be difficult, such being undesirable.

Hydrothermal Pulverization Treatment Step

Then, a hydrothermal pulverization step is carried out wherein the silica hydrogel thus obtained, is subjected to hydrothermal treatment in a slurry state having a $SiO_2$ concentration of from 5.0 to 15.0 wt % with stirring to obtain a pulverized silica hydrogel slurry having an average particle size of at most 100 μm. As an apparatus for hydrothermal treatment, it is common to employ an autoclave which is a high pressure apparatus equipped with stirring vanes. If the average particle size is from 0.1 to 5 mm, the silica hydrogel can easily be pulverized to an average particle size of not more than 100 μm, more preferably not more than 20 μm and at least 1 μm.

The temperature range for the hydrothermal treatment is usually from 130 to 230° C., preferably from 150 to 230° C. If the temperature is lower than 130° C., the effect for pulverizing the particle size of silica hydrogel by the hydrothermal treatment tends to be poor, and if it exceeds 230° C., the effect for accelerating pulverization of the particles of silica hydrogel by the hydrothermal treatment corresponding to the increase of the temperature level, tends to be small, such being technically and economically disadvantageous.

The time for the hydrothermal pulverization treatment varies depending upon the hydrothermal treatment temperature, but it is usually from 0.2 to 24 hours. If the hydrothermal treatment time is less than 0.2 hour, no adequate effect for reducing the particle size by the hydrothermal treatment can be obtained, and if the hydrothermal treatment time exceeds 24 hours, recoagulation of particles tends to occur.

Wet Pulverization Treatment

When it is desired to obtain smaller particles of a level where the desired average particle size of fine spherical silica gel obtainable by drying the silica hydrogel slurry is at most 100 μm, preferably at most 10 μm, it is preferred to further pulverize the silica hydrogel slurry pulverized by the hydrothermal pulverization treatment to an average particle size of at most 20 μm, by mechanical wet pulverization, to a level 5 of from 1 to 3 μm. By such pulverization treatment, fine spherical silica gel obtainable by e.g. spray drying will be more spherical, and the particle surface will be smoother . As a wet system pulverizer to be used here, a beads mill which is a wet system medium stirring mill employing beads having a particle size of at most 1 mm, or a wet system medium stirring pulverizer or a wet system ball mill employing balls having a particle size of a few mm, may be employed.

Drying Step

A drying apparatus to obtain monodispersed fine silica gel particles by drying the silica hydrogel slurry thus obtained, is preferably of a type wherein particles or liquid droplet will be dispersed in hot air without forming a fixed layer in order to prevent coagulation of the particles to one another, and, for example, a spray dryer, a medium fluidized bed dryer or a flash dryer is suitable.

Especially when it is intended to obtain fine spherical silica gel, a spray dryer is suitable as the drying apparatus.

Step of Preparing a Mixed Slurry by Introducing Microparticles of a Metal Compound Also in a case where microparticles of a metal compound are internally contained, the operation is basically the same as described above, except that a step of introducing and mixing microparticles of a metal compound at a suitable point of time, is carried out.

In a specific embodiment, in the silica hydrogel slurry pulverized by the hydrothermal pulverization step or in the silica hydrogel slurry further pulverized by wet pulverization as the case requires, microparticles of a metal compound such as titanium dioxide, zinc oxide, cerium oxide, iron oxide or zirconium oxide having an average particle size of from 0.002 to 0.5 μm, are added and introduced in an amount of from 5 to 80 wt % based on the weight of $SiO_2$ and thoroughly dispersed, as mentioned above, to obtain a mixed slurry comprising fine particles of silica hydrogel and fine particles of a metal compound. This dispersion is preferably carried out in the autoclave for the hydrothermal pulverization treatment or the wet system pulverizer, as mentioned above.

The mixed slurry thus obtained is subjected to e.g. spray drying in the same manner as in the case of obtaining fine particulate silica gel, to obtain fine particulate silica gel internally containing microparticles of a metal compound.

As mentioned above, the microparticles of a metal compound internally contained in the silica gel have particle sizes which are far smaller than the particle sizes of silica gel particles, and at least one, usually a few, preferably many microparticles of a metal compound are contained as dispersed in one silica gel particle. For the purpose of the present invention, "internally contained" means that microparticles of a metal compound are contained in such a state in the silica gel particles.

It is considered that in the process of drying silica gel particles having many pores, only the liquid phase of the slurry filling the pores will be evaporated for drying, whereby non-volatile microparticles of a metal compound will remain as supported in the pores in the interior of the silica gel. This is considered to be the mode in which the microparticles of a metal compound are internally contained in the silica gel particles in the present invention.

Now, the present invention will be described in further detail with reference to Examples. However, it should be understood that the present invention is by no means restricted to such specific Examples.

EXAMPLE 1

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of the flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola in air for about 1 second. At the falling site, an aging tank containing water was placed, and the gelled particles were permitted to fall in the aging tank and aged.

After the aging, the pH was adjusted to 6, followed by washing thoroughly with water, to obtain a silica hydrogel. The obtained silica hydrogel particles had 15 particle shapes which are spherical, and the average particle size was 6 mm. The weight ratio of water to the weight of $SiO_2$ in the silica hydrogel particles was 4.5, and the sodium remaining in the silica hydrogel particles was 103 ppm.

Hydrothermal Pulverization Treatment Step

Then, the silica hydrogel was roughly pulverized by means of a roll crusher to an average particle size of 1.0 mm. Into an autoclave equipped with anchor-type stirring vanes and having an internal capacity of 50 l, 22,000 g of the above roughly pulverized silica hydrogel and 18,000 g of water were charged, and hydrothermal pulverization treatment was carried out in a slurry state with a $SiO_2$ concentration of 10.0 wt % at a temperature of 200° C. for 3 hours at a stirring rotational speed of 90 rpm. The pH of the silica hydrogel slurry was 6.

The silica hydrogel particles in the slurry after the hydrothermal pulverization treatment were finely pulverized and had an average particle size of 15 μm by the particle size measurement by a Coulter counter (MAII Model, manufactured by Coulter Electronics Inc., employing an aperture tube diameter of 280 μm). Further, the $SiO_2$ concentration in the slurry after the hydrothermal treatment was 10.3 wt %.

Wet Pulverization Step

Then, the above slurry was, at the same concentration, further pulverized by means of a wet system pulverizer (Dyno mill, manufactured by Shinmaru Enterprises Co., employing beads having a diameter of 0.5 mm). The average particle size of the silica hydrogel particles in the slurry after the fine pulverization was 1.6 μm, as measured by a Coulter counter (MAII Model, employing an aperture tube diameter of 50 μm).

Further, the amounts of the silica hydrogel and water in the silica hydrogel slurry after the above fine pulverization were measured by the following method.

50 g of the silica hydrogel slurry was taken into a beaker, and by means of a milli pore filter having a pore diameter of 0.45 μm, the entire amount was filtered under reduced pressure of an absolute pressure of 5 mmHg and dehydrated for 40 minutes. The weight of the obtained filtrate was taken as the amount of water, and the weight of the obtained wet cake was taken as the weight of the silica hydrogel. The weight of $SiO_2$ in the obtained wet cake was obtained from the weight after drying at a temperature of 180° C. for 4 hours by a dryer. The ratio of the weight of water to the weight of the silica hydrogel in the slurry obtained by this measurement method, was 4.4.

Drying Step

Then, the above slurry was spray-dried at the same concentration by means of a small size spray dryer (GA32 Model, manufactured by Yamato Kagaku K.K.) at a slurry supply rate of 13 ml/min under a spray pressure of 1.2 kg/cm² (G) at a hot air temperature of 200° C., to obtain finely dried silica gel particles. The average particle size of the obtained dried particles was 4.5 μm as measured by a Coulter counter (MAII Model, employing an aperture tube diameter of 50 μm). The shape of the particles was substantially spherical, and the particle surface was smooth.

The pore structure of the particles were measured by a BELSORP (BELSORP 28 Model, manufactured by Nippon Bell Co., BET system), whereby the pore volume was 0.85 ml/g, and the specific surface area was 130 m²/g.

Further, the oil absorption of the particles by JIS K5101 was 177 ml/100 g.

The equilibrium moisture adsorption at 25° C. by the JIS Z0701 method of the particles was measured, whereby the moisture adsorption under a relative humidity of 90%, was 9.9 wt %.

The mechanical strength of the particles were measured by a fine compression tester (MCTM-500 Model) manufactured by Shimadzu Corporation, whereby the average value of 30 particles was 0.45 kgf/mm².

10 g of the above particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 2

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of flow amounts of the two solutions were adjusted so that the pH of the solution discharged into air from the discharge outlet would be from 7.5 to 8.0, and the uniformly mixed silica sol solution was continuously discharged from the discharge outlet into air. The discharged solution became spherical liquid droplets in air and gelled in air while flying to draw a parabola for about 1 minute. At the falling site, an aging tank containing water was placed, and the gelled particles were permitted to fall into the aging tank and aged.

After the aging, the pH was adjusted to 6, followed by washing thoroughly with water, to obtain a silica hydrogel. The obtained silica hydrogel particles had a particle shape which was spherical, and the average particle diameter was 5 mm. The weight ratio of water to the weight of $SiO_2$ in the silica hydrogel particles, was 4.5, and the sodium remaining in the silica hydrogel particles was 100 ppm.

Hydrothermal Pulverization Treatment Step

Then, the silica hydrogel was roughly pulverized by means of a roll crusher to an average particle size of 1.0 mm. Into an autoclave equipped with anchor type stirring vanes and having an internal capacity of 50 l, 22,000 g of the above roughly pulverized silica hydrogel and 18,000 g of water were charged and subjected to hydrothermal pulverization treatment in a slurry state with a $SiO_2$ concentration of 10.0 wt % at a temperature of 200° C. for 20 hours at a stirring rotational speed of 50 rpm. The pH of the silica hydrogel slurry was 6.

The silica hydrogel particles in the slurry after the hydrothermal pulverization treatment, were finely pulverized and had an average particle diameter of 13 μm by the particle size measurement by a Coulter counter (MAII Model, manufactured by Coulter Electronics Inc., employing an aperture tube diameter of 280 μm). Further, the $SiO_2$ concentration in the slurry after the hydrothermal treatment was 10.3 wt %.

Wet Pulverization Step

Then, the above slurry was, at the same concentration, further pulverized by means of the same wet type pulverizer as in Example 1. The average particle size of the silica hydrogel particles in the slurry after the fine pulverization by a Coulter counter (MAII Model, employing an aperture tube diameter of 50 μm), was 1.5 μm.

Further, in the same manner as in Example 1, the amounts of the silica hydrogel and water in the silica hydrogel slurry after the above fine pulverization, were measured, whereby the ratio of the weight of water to the weight of the silica hydrogel was 4.4.

Drying Step

Then, the above slurry was, at the same concentration, spray-dried by means of a small size spray dryer (GA32 Model, manufactured by Yamato Kagaku K.K.) at a slurry supply rate of 13 ml/min under a spray pressure of 1.2 kg/cm$^2$(G) at a hot air temperature of 200° C., to obtain fine dried silica gel particles. The average particle size of the obtained dried particles was 4.5 μm as measured by a Coulter counter (MAII Model, employing an aperture tube diameter of 50 μm). The shape of the particles was substantially spherical, and the particle surface was smooth.

The pore structure of the particles was measured by a BELSORP (BELSORP 28 Model, manufactured by Nippon Bell Co., BET system), whereby the pore volume was 0.31 ml/g, and the specific surface area was 53 m$^2$/g.

Further, the oil absorption by the JIS K5101 method of the particles was 151 ml/100 g.

An equilibrium moisture adsorption at 25° C. by the JIS Z0701 method was measured, whereby the moisture adsorption under a relative humidity of 90%, was 4.5 wt %.

The mechanical strength of the particles was measured by a fine compression tester (MCTM-500 Model) manufactured by Shimadzu Corporation, whereby the average value of 30 particles was 0.78 kgf/mm$^2$.

10 g of the particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 3

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 4 mm. The weight ratio of water to the weight of $SiO_2$ in the silica hydrogel particles, was 4.5, and the sodium remaining in the silica hydrogel particles was 95 ppm.

Hydrothermal Pulverization Treatment Step

Then, the silica hydrogel was roughly pulverized by means of a roll crusher to an average particle size of 0.8 mm. Into an autoclave equipped with anchor type stirring vanes and having an internal capacity of 50 l, 22,000 g of the above roughly pulverized silica hydrogel and 18,000 g of water were charged and subjected to hydrothermal pulverization treatment in a slurry state with a $SiO_2$ concentration of 10.0 wt % at a temperature of 185° C. for 20 hours at a stirring rotational speed of 100 rpm. The pH of the silica hydrogel slurry was 6.

The average particle size of the silica hydrogel particles in the slurry after the hydrothermal pulverization treatment was 17 μm as measured by a Coulter counter (MAII Model, manufactured by Coulter Electronics Inc., employing an aperture tube diameter of 280 μm). Further, the $SiO_2$ concentration in the slurry after the hydrothermal treatment was 10.3 wt %.

Wet Pulverization Step

Then, the above slurry was, at the same concentration, finely pulverized by means of the same wet system pulverizer as in Example 1. The average particle size of the silica hydrogel particles in the slurry after the fine pulverization was 1.7 μm as measured by a Coulter counter (MAII Model, employing an aperture tube diameter of 50 μm).

Further, in the same manner as in Example 1, the amounts of the silica hydrogel and water in the silica hydrogel slurry after the above fine pulverization, were measured, and the ratio of the weight of water to the weight of the silica hydrogel was 4.4.

Drying Step

Then, the above slurry was spray-dried at the same concentration by means of a small size spray dryer (GA32 Model, manufactured by Yamato Kagaku K.K.) at a slurry supply rate of 13 ml/min under a spray pressure of 1.2 kg/cm$^2$(G) at a hot air temperature of 200° C., to obtain finely dried silica gel particles. The average particle size of the obtained dried particles was 4.5 μm, as measured by a Coulter counter (employing an aperture tube diameter of 50 μm). The shape of the particles was substantially spherical, and the particle surface was smooth.

The pore structure of the particles was measured by a BELSORP (BELSORP 28 Model, manufactured by Nippon Bell Co., BET system), whereby the pore volume was 0.87 ml/g, and the specific surface area was 110 m$^2$/g.

Further, the oil absorption by the JIS K5101 method of the particles was 180 ml/100 g.

The equilibrium moisture adsorption at 25° C. by the JIS Z0701 method was measured, whereby the moisture adsorption under a relative humidity of 90% was 12.5 wt %.

The mechanical strength of the particles was measured by a fine compression tester (MCTM-500 Model), manufactured by Shimadzu Corporation, whereby the average value of 30 particles was 0.40 kgf/mm².

10 g of the particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 4

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water, was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 5 mm. The weight ratio of water to the weight of $Sio_2$ in the silica hydrogel particles was 4.0, and sodium remaining in the silica hydrogel particles was 98 ppm.

Hydrothermal Pulverization Treatment Step

Then, the silica hydrogel was roughly pulverized by means of a roll crusher to an average particle size of 1.5 mm. Into an autoclave equipped with anchor type stirring vanes and having an internal capacity of 50 l, 20,000 g of the above roughly pulverized silica hydrogel and 20,000 g of water were charged to obtain a slurry. An aqueous sodium hydroxide solution was added to adjust the pH to 10, and the silica hydrogel slurry having a $SiO_2$ concentration of 10.0 wt % thus obtained was subjected to hydrothermal pulverization treatment at a temperature of 200° C. for 3 hours at a stirring rotational speed of 90 rpm.

The silica hydrogel particles in the slurry after the hydrothermal pulverization treatment, were finely pulverized, and the average particle size was 13 μm as measured by a Coulter counter (MAII Model, manufactured by Coulter Electronics Inc., employing an aperture tube diameter of 280 μm). Further, the $SiO_2$ concentration in the slurry after the hydrothermal treatment was 10.2 wt %.

Wet Pulverization Step

Then, the above slurry was at the same concentration wet-pulverized by means of the same wet system pulverizer as in Example 1. The average particle size of the silica hydrogel particles in the slurry after the wet pulverization was 1.4 μm as measured by a Coulter counter (MAII Model, employing an aperture tube diameter of 50 μm).

Further, the ratio of the weight of water to the weight of the silica hydrogel in the slurry after the above pulverization, obtained by the same measuring method as in Example 1, was 3.5.

Drying Step

The above slurry was at the same concentration spray-dried by means of a small size spray dryer (GA32 Model, manufactured by Yamato Kagaku K.K.) at a slurry supply rate of 13 ml/min under a spray pressure of 1.2 kg/cm²(G) at a hot air temperature of 200° C., to obtain fine dried silica gel particles. The average particle size of the obtained dried particles was 5.2 μm, as measured by a Coulter counter (MAII Model, employing an aperture tube diameter of 50 μm), and the particle shape was substantially spherical, and the particle surface was smooth.

The pore structure of the particles was measured by a BELSORP (BELSORP 28 Model, manufactured by Nippon Bell Co., BET system), whereby the pore volume was 0.45 ml/g, and the specific surface area was 53 m²/g.

Further, the oil absorption by the JIS K5101 method of the particles was 161 ml/100 g.

The equilibrium moisture adsorption at 25° C. by the JIS Z0701 method was measured, whereby the moisture adsorption under a relative humidity of 90% was 4.2 wt %.

Further, the mechanical strength of the particles was measured by a fine compression tester (MCTM-500 Model), manufactured by Shimadzu Corporation, whereby the average value of 30 particles was 0.56 kgf/mm².

10 g of the particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 5

Hydrogelation Step 2.0 l/min of an aqueous sodium silicate solution having a $SiO_2/Na_2O$ ratio=3.0 (molar ratio) and a $SiO_2$ concentration=23.0 wt % and an aqueous sulfuric acid solution having a sulfuric acid concentration=20.0 wt % were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water, to obtain a silica hydrogel. The particle shape of the obtained silica hydrogel particles was spherical, and the average particle size was 3 mm. The weight ratio of the water to the weight of $SiO_2$ in the silica hydrogel particles was 1.7, and sodium remaining in the silica hydrogel particles was 108 ppm.

Hydrothermal Pulverization Treatment Step

Then, the silica hydrogel was roughly pulverized by means of a roll crusher to an average particle size of 0.2 mm. Into an autoclave equipped with anchor type stirring vanes and having an internal capacity of 50 l, 20,000 g of the above roughly pulverized silica hydrogel and 30,000 g of water were charged and subjected to hydrothermal pulverization treatment in a slurry state with a $SiO_2$ concentration of 14.8 wt % at a temperature of 210° C. for 24 hours at a stirring rotational speed of 120 rpm. The pH of the silica hydrogel slurry was 6.

The silica hydrogel particles in the slurry after the hydrothermal treatment were finely pulverized, and the average particle size was 20 μm as measured by a Coulter counter (MAII Model, manufactured by Coulter Electronics Inc., employing an aperture tube diameter of 280 µm). Further, the $SiO_2$ concentration in the slurry after the hydrothermal treatment was 14.5 wt %.

Wet Pulverization Step

The above slurry was at the same concentration wet-pulverized by means of the same wet type pulverizer as in Example 1. The average particle size of the silica hydrogel particles in the slurry after the wet pulverization was 2.0 µm as measured by a Coulter counter (MAII Model, employing an aperture tube diameter of 50 µm).

Further, the ratio of the weight of water to the weight of the silica hydrogel in the slurry after the above fine pulverization, obtained by the same measuring method as in Example 1, was 1.7.

Drying Step

Then, the above slurry was at the same concentration spray-dried by means of a small size spray dryer (GA32 Model, manufactured by Yamato Kagaku K.K.) at a slurry supply rate of 13 ml/min under a spray pressure of 1.2 kgf/cm²(G) at a hot air temperature of 200° C. to obtain fine dried silica gel particles. The average particle size of the obtained dried particles was 9.0 µm as measured by a Coulter counter (employing an aperture tube diameter of 50 µm), and the particle shape was spherical.

The pore structure of the particles was measured by a BELSORP (BELSORP 28 Model, manufactured by Nippon Bell Co., BET system), whereby the pore volume was 0.38 ml/g, and the specific surface area was 47 m²/g.

Further, the oil absorption by the JIS K5101 method of the particles was 145 ml/100 g.

The equilibrium moisture adsorption at 25° C. by the JIS Z0701 method was measured, whereby the moisture adsorption under a relative humidity of 90% was 4.3 wt %.

Further, the mechanical strength of the particles was measured by a fine compression tester (MCTM-500 Model), manufactured by Shimadzu Corporation, whereby the average value of 30 particles was 0.98 kgf/mm².

10 g of the particles were put into a powder container of a tumbler shaker mixer manufactured by Kabushiki Kaisha Shinmaru Enterprises which is a small size powder mixer, and shaked for 20 minutes without using alumina balls, whereby the particles before and after the shaking were inspected by a scanning electron microscope, and no breakage of the particles was observed.

EXAMPLE 6

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 5 mm. The weight ratio of water to the weight of $SiO_2$ in the silica hydrogel particles was 4.2, and sodium remaining in the silica hydrogel particles was 100 ppm.

Hydrothermal Pulverization Treatment Step

The silica hydrogel was roughly pulverized by means of a roll crusher to an average particle size of 2.0 mm. Into an autoclave equipped with anchor type stirring vanes and having an internal capacity of 50 l, 22,000 g of the above roughly pulverized silica hydrogel and 18,000 g of water were charged and subjected to hydrothermal pulverization treatment in a slurry state with a $SiO_2$ concentration of 10.0 wt % at a temperature of 200° C. for 3 hours at a stirring rotational speed of 100 rpm. The pH of the silica hydrogel slurry was 6.

The silica hydrogel particles in the slurry after the hydrothermal treatment, were finely pulverized, and the average particle size was 18 µm as measured by a Coulter counter (MAII Model, manufactured by Coulter Electronics Inc., employing an aperture tube diameter of 280 µm) Further, the $SiO_2$ concentration in the slurry after the hydrothermal treatment was 10.2 wt %.

In the same manner as in Example 1, the amounts of the silica hydrogel and water in the silica hydrogel slurry after the above hydrothermal treatment were measured, whereby the ratio of the weight of water to the weight of the silica hydrogel was 2.0.

Drying Step

Then, the above slurry was at the same concentration spray-dried by means of a medium fluidized bed dryer (SFD-mini model, manufactured by Ogawara Seisakusho) at a slurry supply rate of 65 ml/min at a hot air temperature of 255° C. to obtain fine dried silica gel particles. The average particle size of the obtained dried particles was 8.9 µm as measured by a Coulter counter (MAII Model, employing an aperture tube diameter of 50 µm), and the particle shape was not uniform.

The pore structure of the particles was measured by a BELSORP (BELSORP 28 Model, manufactured by Nippon Bell Co., BET system), whereby the pore volume was 0.72 ml/g, and the specific surface area was 144 m²/g.

Further, the oil absorption by the JIS K5101 method of the particles was 193 ml/100 g.

The equilibrium moisture adsorption at 25° C. by the JIS Z0701 method was measured, whereby the moisture adsorption under a relative humidity of 90% was 8.0 wt %.

10 g of the particles were put into a particle container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 7

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt %, were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 6 mm. The weight ratio of water to the weight of $SiO_2$ in the silica hydrogel particles was 4.5, and sodium remaining in the silica hydrogel particles was 98 ppm.

Hydrothermal Pulverization Treatment Step

Then, the silica hydrogel was roughly pulverized by means of a roll crusher to an average particle size of 0.7 mm. Into an autoclave equipped with anchor type stirring vanes and having an internal capacity of 50 l, 20,000 g of the above roughly pulverized silica hydrogel and 7,970 g of water were charged and slurried, and an aqueous sodium hydroxide solution was added to adjust the pH to 10, and the silica hydrogel slurry having a $SiO_2$ concentration of 13.0 wt % thus obtained was subjected to hydrothermal pulverization treatment at a temperature of 200° C. for 24 hours at a stirring rotational speed of 90 rpm.

The silica hydrogel particles in the slurry after the hydrothermal treatment were finely pulverized, and the average particle size was 19 pm as measured by a Coulter counter (MAII Model, manufactured by Coulter Electronics Inc., employing an aperture tube diameter of 280 $\mu$m). Further, the $SiO_2$ concentration in the slurry after the hydrothermal treatment was 13.2 wt %.

Wet Pulverization Step

The above slurry was at the same concentration wet-pulverized by means of the same wet system pulverizer as in Example 1. The average particle size of the silica hydrogel particles in the slurry after the wet pulverization was 1.7 $\mu$m as measured by a Coulter counter (MAII Model, employing an aperture tube diameter of 50 $\mu$m).

Further, the ratio of the weight of water to the weight of the silica hydrogel in the slurry after the above pulverization obtained by the same measuring method as in Example 1, was 3.5.

Drying Step

Then, the above slurry was at the same concentration spray-dried by means of a small size spray dryer (GA32 Model, manufactured by Yamato Kagaku K.K.) at a slurry supply rate of 13 ml/min under a spray pressure of 1.2 kg/cm$^2$(G) at a hot air temperature of 200° C. to obtain fine dried silica gel particles. The average particle size of the obtained dried particles was 9.8 $\mu$m as measured by a Coulter counter (MAII Model, employing an aperture tube diameter of 50 $\mu$m), and the particle shape was substantially spherical, and the particle surface was smooth.

The pore structure of the particles was measured by a BELSORP (BELSORP 28 Model, manufactured by Nippon Bell Co., BET system), whereby the pore volume was 0.35 ml/g, and the specific surface area was 45 m$^2$/g.

Further, the oil absorption by the JIS K5101 method of the particles was 130 ml/100 g.

The equilibrium moisture adsorption at 25° C. by the JIS Z0701 method was measured, whereby the moisture adsorption under a relative humidity of 90% was 4.0 wt %.

Further, the mechanical strength of the particles was measured by a fine compression tester (MCTM-500 Model) manufactured by Shimadzu Corporation, whereby the average value of 30 particles was 0.85 kgf/mm$^2$.

10 g of the particles were put into a powder container of a tumbler shaker mixer manufactured by Kabushiki Kaisha Shinmaru Enterprises which is a small size powder mixer, and shaked for 20 minutes without using alumina balls, whereby the particles before and after the shaking were inspected by a scanning electron microscope, and no breakage of the particles was observed.

EXAMPLE 8

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt % were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 5 mm. The weight ratio of water to the weight of $SiO_2$ in the silica hydrogel particles was 4.5, and sodium remaining in the silica hydrogel particles was 100 ppm.

Hydrothermal Pulverization Treatment Step

The silica hydrogel was roughly pulverized by means of a roll crusher to an average particle size of 0.2 mm. Into an autoclave equipped with anchor type stirring vanes and having an internal capacity of 50 l, 22,000 g of the above roughly pulverized silica hydrogel and 18,000 g of water were charged and slurried, and an aqueous sodium hydroxide solution was added to adjust the pH to 10, and the silica hydrogel slurry having a $SiO_2$ concentration of 10.0 wt % thus obtained was subjected to hydrothermal pulverization treatment at a temperature of 210° C. for 24 hours at a stirring rotational speed of 120 rpm. The pH of the silica hydrogel slurry was 10.

The silica hydrogel particles in the slurry after the hydrothermal pulverization treatment were finely pulverized, and the average particle size was 6 $\mu$m as measured by a Coulter counter (MAII Model, manufactured by Coulter Electronics Inc., employing an aperture tube diameter of 280 $\mu$m). Further, the $SiO_2$ concentration in the slurry after the hydrothermal treatment was 10.3 wt %.

Further, the ratio of the weight of water to the weight of the silica hydrogel in the slurry after the above hydrothermal pulverization obtained by the same measuring method as in Example 1, was 1.6.

Drying Step

Then, the above slurry was at the same concentration spray-dried by means of a spray dryer (diameter: 1.5 m, the spray portion being a high speed rotational disk system) at a slurry supply rate of 80 ml/min at a hot air temperature of 200° C.

The average particle size of the obtained dried particles was 52 $\mu$m as measured by a Coulter counter (MAII Model, employing an aperture tube diameter of 280 $\mu$m), and the particle shape was spherical.

The pore structure of the particles was measured by a BELSORP (BELSORP 28 Model, manufactured by Nippon Bell Co., BET system), whereby the pore volume was 0.38 ml/g, and the specific surface area was 50 m$^2$/g.

Further, the oil absorption by the JIS K5101 method of the particles was 138 ml/100 g.

The equilibrium moisture adsorption at 25° C. by the JIS Z0701 method was measured, whereby the moisture adsorption under a relative humidity of 90% was 4.2 wt %.

10 g of the particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

EXAMPLE 9

Hydrogelation Step 2.0 /min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt % were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 4 mm. The weight ratio of water to the weight of $SiO_2$ in the silica hydrogel particles was 4.5, and sodium remaining in the silica hydrogel particles was 101 ppm.

Hydrothermal Pulverization Treatment Step

Then, the silica hydrogel was roughly pulverized by means of a roll crusher to an average particle size of 1.0 mm. Into an autoclave equipped with anchor type stirring vanes and having an internal capacity of 50 l, 22,000 g of the above roughly pulverized silica hydrogel and 18,000 g of water were charged and subjected to hydrothermal pulverization treatment in a slurry state with a $SiO_2$ concentration of 10.0 wt % at a temperature of 200° C. for 3 hours at a stirring rotational speed of 90 rpm. The pH of the silica hydrogel slurry was 6.

The silica hydrogel particles in the slurry after the hydrothermal treatment were finely pulverized, and the average particle size was 17 μm as measured by a Coulter counter (MAII Model, manufactured by Coulter Electronics Inc., employing an aperture tube diameter of 280 μm). Further, the $SiO_2$ concentration in the slurry after the hydrothermal treatment was 10.2 wt %.

Wet Pulverization Step

The above slurry was at the same concentration wet-pulverized by means of the same wet system pulverizer as in Example 1. The average particle size of the silica hydrogel particles in the slurry after the pulverization was 1.6 μm as measured by a Coulter counter (MAII Model, employing an aperture tube diameter of 50 μm).

Step of Preparing a Mixed Slurry

To 17,000 g of the silica hydrogel slurry after the above wet pulverization, 200 g of titanium oxide (tradename: TTO-51A, average particle size: 0.02 μm, rutile type) manufactured by Ishihara Sangyo Kaisha, Ltd. and 600 g of zinc oxide (tradename: ZnO-310, average particle size: 0.03 μm) manufactured by Sumitomo Osaka Cement Co., Ltd. were added, and the pH of the slurry was adjusted to 10. Then, by means of the same wet system pulverizer as described above, the three components i.e. the silica hydrogel, titanium oxide and zinc oxide, were mixed and dispersed.

Drying Step

The slurry after the above dispersion was at the same concentration spray-dried by means of a small size spray dryer (GA32 Model, manufactured by Yamato Kagaku K.K.) at a slurry supply rate of 13 ml/min under a spray pressure of 1.2 kg/cm² (G) at a hot air temperature of 200° C. to obtain fine spherical particles having microparticles of titanium oxide and zinc oxide dispersed and internally contained in the silica gel particles. The obtained particle shape was substantially spherical, and the particle surface was smooth.

The average particle size was 5.6 μm as measured by a Coulter counter (MAII Model, employing an aperture tube diameter of 50 μm).

The chemical composition of the particles was analyzed, whereby $SiO_2$ was 68.2 wt %, $TiO_2$ was 7.9 wt % and ZnO was 23.9 wt %.

The pore structure of the particles was measured by a BELSORP (BELSORP 28 Model, manufactured by Nippon Bell Co., BET system), whereby the pore volume was 0.83 ml/g, and the specific surface area was 113 M²/g.

Further, the oil absorption by the JIS K5101 method of the particles was 180 ml/100 g.

The equilibrium moisture adsorption at 25° C. by the JIS Z0701 method was measured, whereby the moisture adsorption under a relative humidity of 90% was 7.0 wt %.

Further, the mechanical strength of the particles was measured by a fine compression tester (MCTM-500 Model) manufactured by Shimadzu Corporation, whereby the average value of 30 particles was 0.18 kgf/mm².

10 g of the particles were put into a powder container of a tumbler shaker mixer manufactured by Kabushiki Kaisha Shinmaru Enterprises, which is a small size powder mixer, and shaked for 20 minutes without using alumina balls, whereby the particles before and after the shaking were inspected by a scanning electron microscope, and no breakage of the particles was observed.

Measurement of the Spectrum Transmittance 0.4 g of the above fine spherical particles, 1.12 g of vaseline and 0.48 g of liquid paraffin were added and thoroughly dispersed by means of a three roll mill to obtain a paste, which was sandwiched between two quartz plates having a thickness of 2 mm and spread until the layer thickness became 25 μm, whereupon the spectral transmittance was measured by means of a self recording type spectrophotometer.

A wavelength of at least 400 nm is a visible light region, and from 400 to 280 nm is an ultraviolet ray region. The smaller the transmittance in the ultraviolet ray region, the better the ultraviolet ray shielding effect, and the larger the transmittance in the visible light region, the higher the transparency as observed by naked eyes.

The transmittance at 500 nm was 81.3%, the transmittance at 400 nm was 69.4%, the transmittance at 360 nm was 21.2%, the transmittance at 320 nm was 18.0%, and the transmittance at 290 nm was 17.6%.

EXAMPLE 10

Hydrogelation Step 2.0 l/min of an aqueous sodium silicate solution having a $SiO_2/Na_2O$ ratio=3.0 (molar ratio) and a $SiO_2$ concentration=21.0 wt % and an aqueous sulfuric acid solution having a sulfuric acid concentration=20.0 wt % were introduced from separate inlets into a container provided with a discharge outlet and instantaneously uniformly mixed, whereby the ratio of flow amounts of the two solutions was adjusted so that the pH of the solution discharged from the discharge outlet into air would be from 7.5 to 8.0, and the uniformly mixed silica sol solution was continuously discharged from the discharge outlet into air. The discharged solution became spherical liquid droplets in air and gelled in air while flying to draw a parabola for about 1 second. At the falling site, an aging tank containing water was placed, and the gelled particles were permitted to fall thereinto and aged.

After the aging, the pH was adjusted to 6, followed by washing thoroughly with water to obtain a silica hydrogel. The obtained silica hydrogel particles had a particle shape which was spherical, and the average particle size was 6 mm. The weight ratio of water to the weight of $SiO_2$ in the silica hydrogel particles was 4.5, and sodium remaining in the silica hydrogel particles was 97 ppm.

Hydrothermal Pulverization Treatment Step

Then, the silica hydrogel was roughly pulverized by means of a roll crusher to an average particle size of 1.0 mm. Into an autoclave equipped with anchor type stirring vanes and having an internal capacity of 50 l, 22,000 g of the above roughly pulverized silica hydrogel and 18,000 g of water were charged, and subjected to hydrothermal pulverization treatment in a slurry state with a $SiO_2$ concentration of 10.0 wt % at a temperature of 200° C. for 3 hours at a stirring rotational speed of 90 rpm. The pH of the silica hydrogel slurry was 6.

The silica hydrogel particles in the slurry after the hydrothermal treatment were finely pulverized, and the average particle size was 15 $\mu$m as measured by a Coulter counter (MAII Model, manufactured by Coulter Electronics Inc., employing an aperture tube diameter of 280 $\mu$m). Further, the $SiO_2$ concentration in the slurry after the hydrothermal treatment was 10.3 wt %.

Wet Pulverization Step

The above slurry was at the same concentration wet-pulverized by means of the same wet system pulverizer as in Example 1. The average particle size of the silica hydrogel particles in the slurry after the pulverization was 1.4 $\mu$m as measured by a Coulter counter (MAII Model, employing an aperture tube diameter of 50 $\mu$m).

Step of Preparing a Mixed Slurry

To 17,000 g of the silica hydrogel slurry after the above wet pulverization, 915 g of titanium oxide manufactured by Ishihara Sangyo Kaisha, Ltd. (tradename: TTO-51A, average particle size: 0.02 $\mu$m, rutile type), was added, and by means of the same wet type pulverizer as described above, the two components i.e. the silica hydrogel and titanium oxide, were mixed and dispersed.

Drying Step

The slurry after the above dispersion was at the same concentration spray-dried by means of a small size spray dryer (GA32 Model, manufactured by Yamato Kagaku K.K.) at a slurry supply rate of 13 ml/min under a spray pressure of 1.2 $kg/cm^2$(G) at a hot air temperature of 200° C. to obtain fine spherical particles having microparticles of titanium oxide dispersed and internally contained in the silica gel particles. The particle shape was substantially spherical, and the particle surface was smooth.

The average particle size was 5.2 $\mu$m as measured by a Coulter counter (MAII Model, employing an aperture tube diameter of 50 $\mu$m).

The chemical composition of the particles was analyzed, whereby $SiO_2$ was 64.8 wt %, and $TiO_2$ was 35.2 wt %.

The pore structure of the particles was measured by a BELSORP (BELSORP 28 Model, manufactured by Nippon Bell Co., BET system), whereby the pore volume was 0.50 ml/g, and the specific surface area was 115 $m^2$/g.

Further, the oil absorption by the JIS K5101 method of the particles was 175 ml/100 g.

The equilibrium moisture adsorption at 25° C. by the JIS Z0701 method was measured, whereby the moisture adsorption under a relative humidity of 90% was 6.8 wt %.

Further, the mechanical strength of the particles was measured by a fine compression tester (MCTM-500 Model) manufactured by Shimadzu Corporation, whereby the average value of 30 particles was 0.45 $kgf/mm^2$.

10 g of the particles were put into a powder container of a tumbler shaker mixer manufactured by Kabushiki Kaisha Shinmaru Enterprises which is a small size powder mixer, and shaked for 20 minutes without using alumina balls, whereby the particles before and after the shaking were inspected by a scanning electron microscope, and no breakage of the particles was observed.

Measurement of the Spectrum Transmittance 0.4 g of the above fine spherical particles, 1.12 g of vaseline and 0.48 g of liquid paraffin were added and thoroughly dispersed by means of a three roll mill to obtain a paste, which was sandwiched between two quartz plates having a thickness of 2 mm and spread until the layer thickness became 25 $\mu$m, whereupon the spectral transmittance was measured by means of a self recording type spectrophotometer.

The transmittance at 500 nm was 56.3%, the transmittance at 400 nm was 41.9%, the transmittance at 360 nm was 13.0%, the transmittance at 320 nm was 7.5%, and the transmittance at 290 nm was 7.8%.

The above results are summarized in Table 1.

TABLE 1

| Examples | Average particle size ($\mu$m) | Particle shape | Pore volume (ml/g) | Specific surface area ($m^2$/g) | Oil absorption (ml/100 g) | Moisture adsorption (wt %) | Mechanical strength ($kgf/mm^2$) |
|---|---|---|---|---|---|---|---|
| 1 | 4.5 | Spherical | 0.85 | 130 | 177 | 9.9 | 0.45 |
| 2 | 4.5 | Spherical | 0.31 | 53 | 151 | 4.5 | 0.78 |
| 3 | 4.5 | Spherical | 0.87 | 110 | 180 | 12.5 | 0.40 |
| 4 | 5.2 | Spherical | 0.45 | 53 | 160 | 4.2 | 0.56 |
| 5 | 9.0 | Spherical | 0.38 | 47 | 145 | 4.3 | 0.98 |
| 6 | 8.9 | Not uniform | 0.72 | 144 | 193 | 8.0 | — |
| 7 | 9.8 | Spherical | 0.35 | 45 | 130 | 4.0 | 0.85 |
| 8 | 52 | Round | 0.38 | 50 | 138 | 4.2 | — |

TABLE 1-continued

| Examples | Average particle size (μm) | Particle shape | Pore volume (ml/g) | Specific surface area (m²/g) | Oil absorption (ml/100 g) | Moisture adsorption (wt %) | Mechanical strength (kgf/mm²) |
|---|---|---|---|---|---|---|---|
| 9 | 5.6 | Spherical | 0.83 | 113 | 180 | 7.0 | 0.18 |
| 10 | 5.2 | Spherical | 0.50 | 115 | 175 | 6.8 | 0.45 |

According to the present invention, it is possible to provide fine spherical silica gel and fine spherical silica gel internally containing microparticles of a metal compound, which have low moisture adsorption and whereby the problems accompanying moisture adsorption in air have been substantially overcome, while the common level of oil absorption of at least 100 ml/100 g is maintained.

Further, according to the present invention, it is possible to provide fine particulate silica gel and fine particulate silica gel internally containing microparticles of a metal compound, which have small mechanical strength and are readily disintegratable, while maintaining the above properties.

What is claimed is:

1. Fine particulate silica gel having the following characteristics (1) to (5):
   (1) average particle size: from 1 to 200 μm;
   (2) oil absorption in accordance with JIS K5101: from 100 to 300 ml/100 g;
   (3) hygroscopicity represented by moisture adsorption under a relative humidity of 90% at 25° C. in accordance with JIS Z0701: not more than 20 wt %;
   (4) spherical particle shape; and
   (5) average value of mechanical strengths of particles having particle sizes of from 2 to 10 μm is from 0.1 to 1.0 kgf/mm².

2. The fine particulate silica gel according to claim 1, wherein said hygroscopicity is 4 to 10 wt. %.

3. Fine particulate silica gel internally containing microparticles of a metal compound and having the following characteristics (1) to (6):
   (1) average particle size: from 1 to 200 μm;
   (2) proportion to $SiO_2$ of the microparticles of a metal compound in the particles: from 5 to 80 wt %;
   (3) oil absorption in accordance with JIS K5101: from 100 to 300 ml/100 g;
   (4) hygroscopicity represented by moisture adsorption under a relative humidity of 90% at 25° C. in accordance with JIS Z0701: not more than 20 wt %;
   (5) spherical shape of particles internally containing the microparticles of a metal compound; and
   (6) average value of mechanical strengths of particles having particle sizes of from 2 to 10 μm is from 0.1 to 1.0 kgf/mm².

4. The fine particulate silica gel according to claim 3, wherein the microparticles of a metal compound are microparticles of a metal compound selected from the group consisting of titanium oxide, zinc oxide, cerium oxide, iron oxide and zirconium oxide.

5. The fine particulate silica gel according to claim 3, wherein said hygroscopicity is 4 to 10 wt. %.

\* \* \* \* \*